United States Patent
Xu et al.

(10) Patent No.: US 7,965,296 B2
(45) Date of Patent: Jun. 21, 2011

(54) SYSTEMS AND METHODS FOR STORING TEXTURE MAP DATA

(75) Inventors: Jim Xu, San Jose, CA (US); John Brothers, Calistoga, CA (US); Sibyl Shao, Shanghai (CN)

(73) Assignee: Via Technologies, Inc., Taipei (TW)

( * ) Notice: Subject to any disclaimer, the term of this patent is extended or adjusted under 35 U.S.C. 154(b) by 1024 days.

(21) Appl. No.: 11/765,119

(22) Filed: Jun. 19, 2007

(65) Prior Publication Data

US 2008/0094407 A1   Apr. 24, 2008

Related U.S. Application Data

(60) Provisional application No. 60/815,053, filed on Jun. 20, 2006.

(51) Int. Cl.
*G06T 11/40* (2006.01)
*G09G 5/00* (2006.01)

(52) U.S. Cl. ......... 345/552; 345/582
(58) Field of Classification Search ........ 345/552, 345/557, 582, 587

See application file for complete search history.

(56) References Cited

U.S. PATENT DOCUMENTS

| | | | |
|---|---|---|---|
| 5,765,182 A | 6/1998 | Lau et al. | |
| 6,204,863 B1 | 3/2001 | Wilde | |
| 6,246,422 B1* | 6/2001 | Emberling et al. | 345/552 |
| 6,266,733 B1 | 7/2001 | Knittel et al. | |
| 6,288,730 B1* | 9/2001 | Duluk et al. | 345/552 |
| 6,650,333 B1* | 11/2003 | Baldwin | 345/552 |
| 6,825,848 B1 | 11/2004 | Fu et al. | |
| 7,050,063 B1 | 5/2006 | Mantor et al. | |
| 7,061,500 B1* | 6/2006 | Baldwin | 345/582 |
| 2004/0015659 A1* | 1/2004 | Dawson | 711/129 |

* cited by examiner

*Primary Examiner* — Kee M Tung
*Assistant Examiner* — Jacinta Crawford
(74) *Attorney, Agent, or Firm* — Thomas, Kayden, Horstemeyer & Risley, LLP

(57) ABSTRACT

Systems and methods for graphics data management are described. One embodiment includes a graphics processing system comprising a texture management unit configured to organize texture map data according to a slice major format, wherein the texture map data spans at least one mip level. Furthermore, the graphics processing system comprises a texture cache, wherein the texture cache is coupled to the texture management unit and configured to receive the organized texture map data from the texture management unit.

19 Claims, 8 Drawing Sheets

SYSTEMS AND METHODS FOR STORING TEXTURE MAP DATA

CROSS-REFERENCE TO RELATED APPLICATION

This application claims priority to, and the benefit of, U.S. Provisional Patent Application entitled, "Texture Cache and Filter Target Specification," having Ser. No. 60/815,053, filed on Jun. 20, 2006, which is incorporated herein by reference in its entirety.

TECHNICAL FIELD

The present disclosure generally relates to graphics processing and more specifically relates to systems and methods for graphics data management.

BACKGROUND

As is known, computer graphics processing systems process large amounts of data, including texture data, among others. A texture is a digital image, often rectangular, having a (u, v) coordinate space. The smallest addressable unit of a texture is a texel, which is assigned a specific (u, v) coordinate based on its location. In a texture mapping operation, a texture is mapped to the surface of a graphical model as the model is rendered to create a destination image. In the destination image, pixels are located at specific coordinates in the (x, y) coordinate system. The purpose of texture mapping is to provide a realistic appearance on the surface of objects.

Texture data often resides in system memory, which is a shared resource. In many computer systems, other devices may attempt to access data used by the graphics processing system or utilize a shared system bus, both of which may result in increased data access time for the graphics processing system. Additionally, requests for data from system memory may take excessive amounts of time for other reasons. Accordingly, accessing system memory may have a performance inhibiting effect on graphics processing systems.

In modern computer graphics, texture processing can include many different types of texture mapping techniques including cubic mapping, mipmapping, and anisotropic mapping among others. The complexity and volume of arithmetic and logical operations utilized to perform texture processing necessitate the use of dedicated circuits in addition to those utilized in other graphics processing operations. Accordingly, these dedicated texture processing circuits can include a significant percentage of the hardware gates that make up a graphics processing unit.

Texture mapping is expensive both in computation and memory accesses. One technique for improving data accessibility is through a texture cache that is dedicated to storing texture data. The texture cache is provided texture data from the system memory before the data is required for texture processing, thereby providing the graphics system with the texture data and reducing the requirement to access system memory. This in turn reduces problems associated with memory latency. However, memory latency continues to be an issue even with the use of texture caches due to perceived inefficient management and storage of texture data. Therefore, a previously unaddressed need exists in the industry for improved and optimized storage in memory of texture tile data.

SUMMARY

Embodiments of the present disclosure provide systems and methods for compressing and storing texture map data in a slice-major format.

One embodiment includes a graphics processing system comprising a texture management unit configured to organize texture map data according to a slice major format, wherein the texture map data spans at least one mip level. Furthermore, the graphics processing system comprises a texture cache, wherein the texture cache is coupled to the texture management unit and configured to receive the organized texture map data from the texture management unit.

Another embodiment includes a method for storing texture map data in a graphics processor and can be broadly summarized by the following: grouping slices of a texture map data together according to mip levels, arranging a multiple slices into the same tile according to a mode flag, calculating parameters relating to each slice for each mip level, calculating a memory address for each slice within the texture map data based on the parameters calculated, and storing the arranged slices in a texture cache.

Yet another embodiment includes a method for storing texture map data in a graphics processor and can be broadly summarized by the following: rearranging slices of a texture map data in a slice-major format, wherein slices with a same level of detail are grouped together, storing the slices with the same level of detail within a tile if the total size of all the slices with the same level of detail is less than the size of the tile, calculating parameters relating to each slice, wherein the parameters are calculated for each level of detail, calculating a new memory address for each slice within the texture map data based on the parameters calculated, and storing the rearranged slices and new memory addresses in a texture cache.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a systems and methods for storing texture data in a slice-major format and the underlying methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Figure 1:
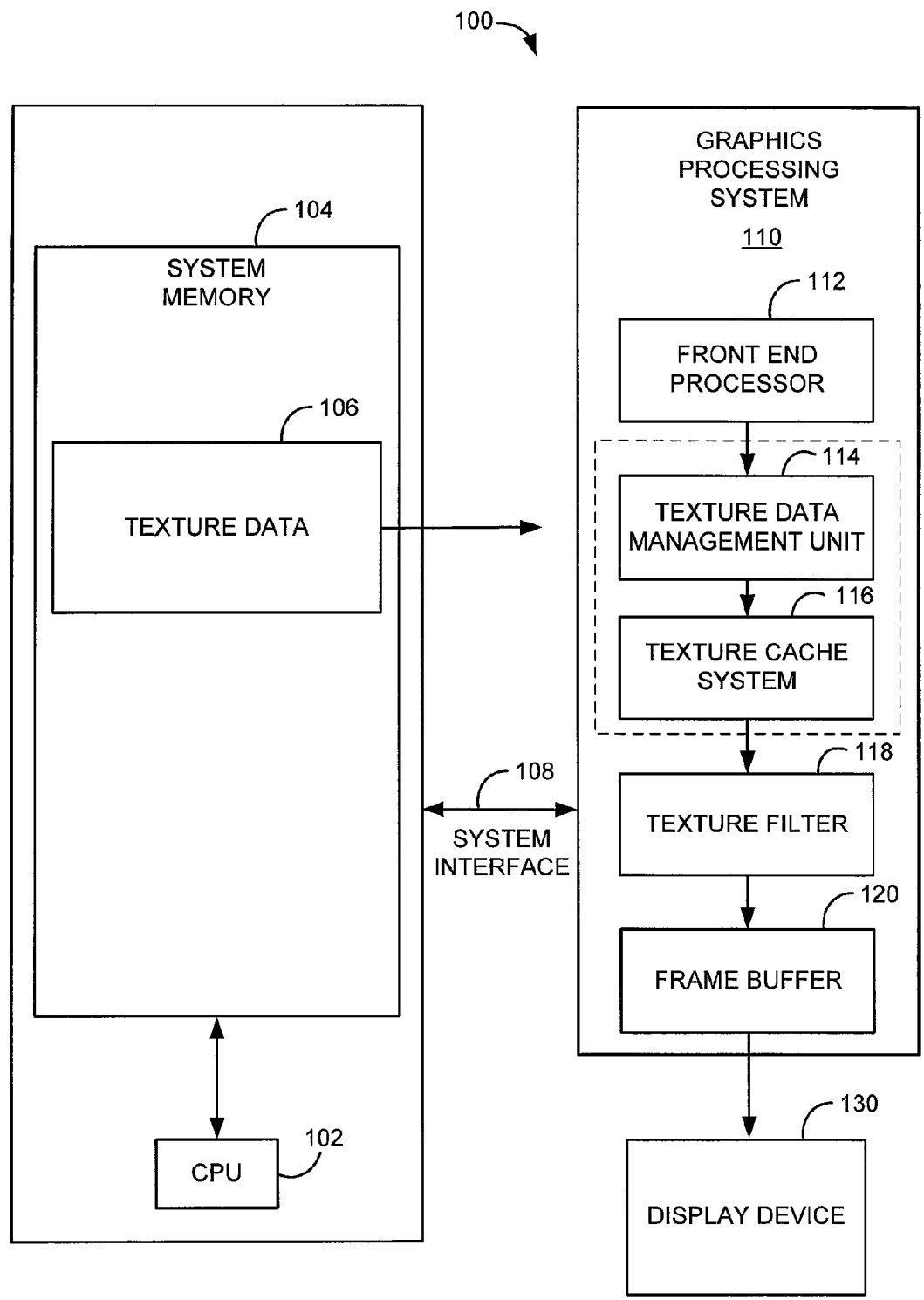
FIG. 1 is a block diagram of an embodiment of a multiple graphics processor system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Systems and methods are disclosed for efficiently managing and organizing texture data such that any texture data required for processing by, for example, a texture filter, is readily retrievable in a graphics processing system. Generally, texture data is received from system memory in a multitude of different formats and sizes. Failure to take into consideration the size or organization of this data may result in inefficient use of texture cache resources. One source of inefficiency occurs when there is too much latency in retrieving texture data. Understandably, this latency from retrieving texture tiling data results in delays in processing this data. An efficient system and method for storing texture tiling data addresses the need for fast processing of graphics data in a computer graphics environment.

Systems and methods for compressing and storing texture map data in a slice-major format are thus described. Mipmaps generally refer to collections of pre-determined collections of images that accompany a main texture. These pre-determined images are simply a copy of the main texture at a reduced resolution. Mipmaps are useful when a particular object is viewed from a distance such that the object and the surrounding texture become smaller. When this smaller version of the object is being viewed, a suitable mipmap image is simply switched in based on the resolution level such that the appropriate level of texture resolution is presented. The use of mipmaps decreases the time needed to render objects due to the fact that pre-determined images are simply looked up as opposed to calculated in real time.

Each mip level within a mipmap chain is assigned a level of detail (LOD) value, which denotes the resolution level. The higher the LOD value, the smaller the image and the lower the resolution. That is, the degree of complexity (e.g., in the texture) of an object becomes less as the object moves farther and farther away from the viewer. For purposes of nomenclature used herein, the use of the term "level of detail" and the term "mip level" are used interchangeably. For a given display, there may be multiple surfaces that must be stored. Each of these surfaces is stored in a contiguous fashion. Furthermore, the texture map data for these surfaces can be stored in a number of ways. As a non-limiting example, texture data may be stored according to a "mip-major" format. That is, the slices within the texture data are organized such that the first slice (e.g., slice 0) for each mip level is stored together. Thus, slice 0 for mip level 1, slice 0 for mip level 2, slice 0 for mip level 3, etc. are all stored together in a contiguous fashion. This is followed by the next slice (e.g., slice 1) for all mip levels and so on. Alternatively, texture data may be stored according to mip levels, or in a "slice-major" format. Thus, slice 0 for mip level 1, slice 1 for mip level 1, slice 2 for mip level 1, etc. are all stored together. That is, all slices within the same mip level are stored together in a contiguous fashion. This is followed by all slices at the next highest mip level and so on.

Texture map data is generally stored according to a mip-major format. Embodiments of the present invention focus on an alternative method for storing texture surface data in a "slice-major" format. As further described herein, embodiments of the present invention increase the efficiency of retrieving texture data by "squeezing" or compressing the data together so that smaller slices don't occupy an entire tile within the texture cache, thereby avoiding wasted memory space.

Generally, a slice refers to 2D images used to render a 3D object. A texture element, or texel, is a 2D point in an image and is a fundamental building block in texture space for graphics processing. A texel is typically addressed by two coordinates, u and v. Textures are generally represented by arrays of texels. During the texture mapping process, a texture lookup takes place to find out where on the texture each pixel center falls. Since the textured surface may be at an arbitrary distance and orientation relative to the viewer, one pixel does not usually correspond directly to one texel. Some form of filtering has to be applied to determine the best color for the pixel. Insufficient or incorrect filtering will show up in the image as artifacts.

Generally, a number of attributes are common when dealing with volume texture mapping schemes. First, when a volume texture is rendered, each slice is typically rendered separately on a slice-by-slice basis. When reading a volume texture, the direction of movement about the texture surface is generally performed in a random manner. When a texture sample is specified, three coordinates are assigned to a 3D (three-dimensional) texture (i.e., volume texture). The change in coordinates in each of the three dimensions is generally equal in probability. Therefore, the probability of an object moving through a given slice is generally the same probability as the object moving within that same slice. By way of illustration, suppose a 3D texture is defined by a (u, v, r) coordinate space. A change in the u and v directions may result in sampling within a given slice, whereas a change in the r direction may result in sampling across multiple slices. Thus, it is preferable that adjacent slices at the same mip level be stored as close as possible to each other within cache memory to allow for more efficient data retrieval. Ideally, these adjacent slices are stored in the same cache page and even within the same cache line within the texture cache. Generally, different views of a particular texture surface will encompass some whole number of slices and mip levels. A view is thus created by generating a render target array comprised of slices spanning a certain number of mip levels. As a non-limiting example, a particular view might be comprised of slices 0 through slice 5 and mip levels 1 through 3. Thus, this particular view is encompassed within six slices and spans three different mip levels. To help ensure that a particular is captured by a whole number of slices and a whole number of mip levels, the texture data is stored as an array of 2D (two-dimensional) mipmaps. Furthermore, the texture data is arranged such that all slices are grouped together and stored according to mip levels. Thus, all slices at a given mip level are stored together, and all slices at the next lower mip level are grouped and stored together. In this manner, the slices are stored in a "slice-major" format. While the number of slices and spanned mip levels is arbitrary in all three dimensions (x, y, z), mipmapped volume textures are generally some power of 2 dimensions. As an example, a volume texture map might be 2048×2048×2048, or $2^{11} \times 2^{11} \times 2^{11}$ pixels. At least one advantage of some embodiments described herein is that texture data is optimally managed and stored according to the characteristics discussed above.

Reference is now made to FIG. 1, which illustrates a simplified block diagram of a computer system 100. The computer system 100 includes a CPU 102, a system memory 104 and a graphics processing system 110. The CPU 102 performs various functions, including determining information, such as a viewpoint location, which allows for the generation of graphic displays. The system memory 104 stores a variety of data, including graphic display data such as texture data 106. The graphics processing system 110, based on information determined by the CPU 102 and data stored in the system memory 104, generates display data for a display device 130, such as, for example, a monitor. Texture mapping is used to apply textures to objects. Graphics processing system 110 renders slices of a 3D object. The slices are essentially "stacked" up to form an object. Once a 3D texture is created, the texture is applied to the object to form an image whereby the object is now textured.

The CPU 102 provides requests to the graphics processing system 110 over a system interface 108, including requests to process and display graphics information. Graphics requests from the CPU 102 are received by the graphics processing system 110 and provided to a front end processor 112. The front end processor 112 generates a pixel stream containing pixel coordinates.

Information relating to the pixel coordinates generated by the front end processor 112 is provided to a texture filter 118 through a texture data management unit 114 and a texture cache system 116. The texture data management unit 114 receives the information from the front end processor 112 and organizes the data before sending the data to the texture cache system 116 for storage.

The texture filter 118 then filters the information performing, for example, bilinear filtering, trilinear filtering, or a combination thereof, and generates texture data for each pixel. In addition to conventional texture filter components, such as linear interpolators and accumulators, the texture filter 118 also includes a programmable table filter for providing special filtering operations in conjunction with the other texture filter components. The texture data is a component of the final color data that is sent to a frame buffer 120, which is used to generate a display on a display device 130.

The texture cache system 116 may include multiple caches, including, for example, a level 1 (L1) cache and a level 2 (L2) cache. The texture information is stored as individual texture elements known as texels, which are used during graphics processing to define color data displayed at pixel coordinates. The texture data flows from the system memory 104 to the texture data management unit 114 and then to the texture cache system 116, and then to the texture filter 118. One should note that for some embodiments, the texture data management unit 114 may be integrated into the texture cache system 116.

Figure 2:
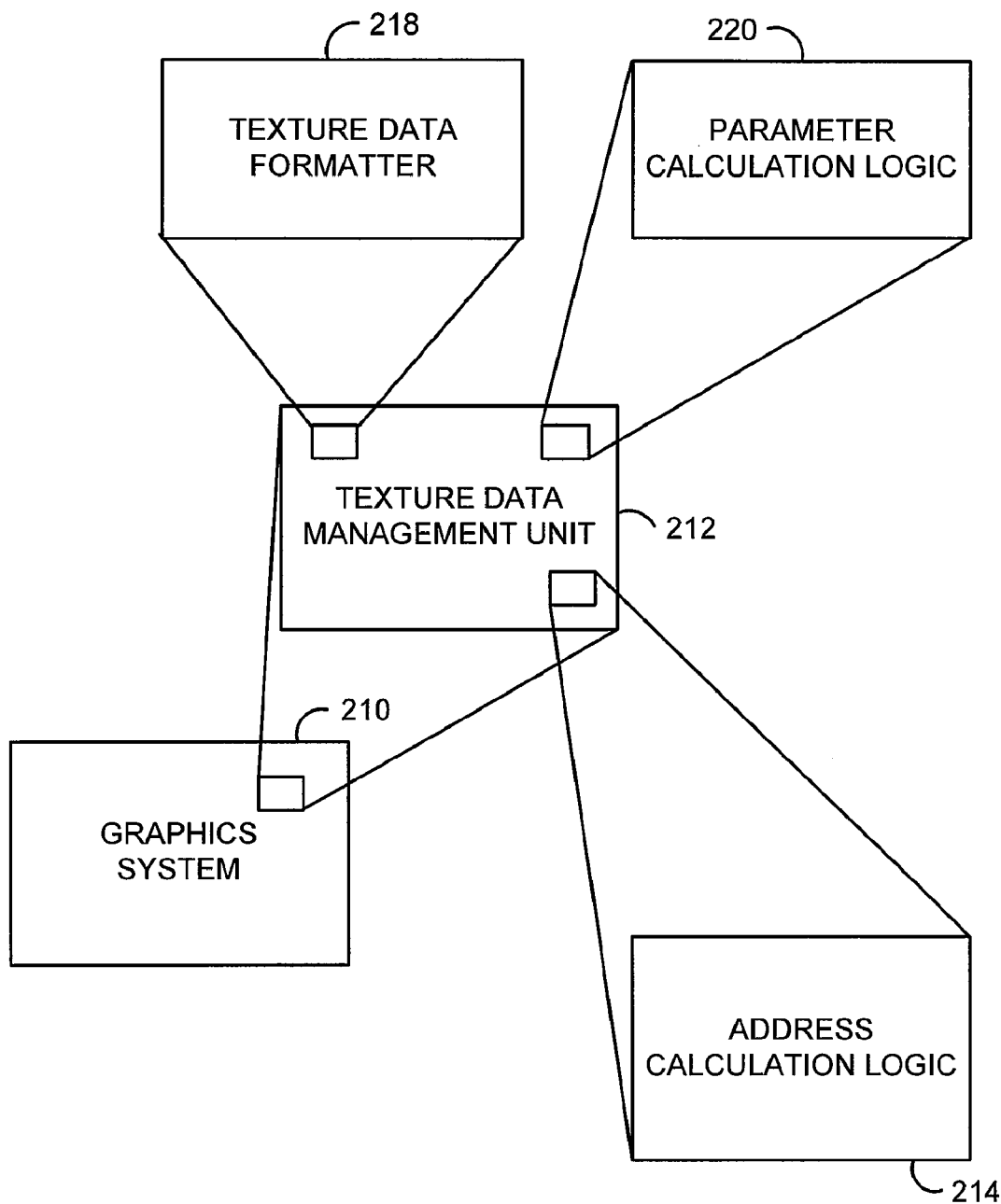
FIG. 2 illustrates certain basic components of the texture data management unit within the computer graphics system.

Reference is now made to FIG. 2, which illustrates certain basic components of the texture data management unit within the computer graphics system. It should be noted that some components not essential for description of the texture data management unit are omitted for purposes of brevity. The computer graphics system 210 includes a texture data management unit 212 which receives texture data 106. The data is compressed and organized before being forwarded to the texture cache system 116. For some embodiments, the texture data management unit 212 includes a texture data formatter 218, parameter calculation logic 220, and address calculation logic 214.

Figure 3:
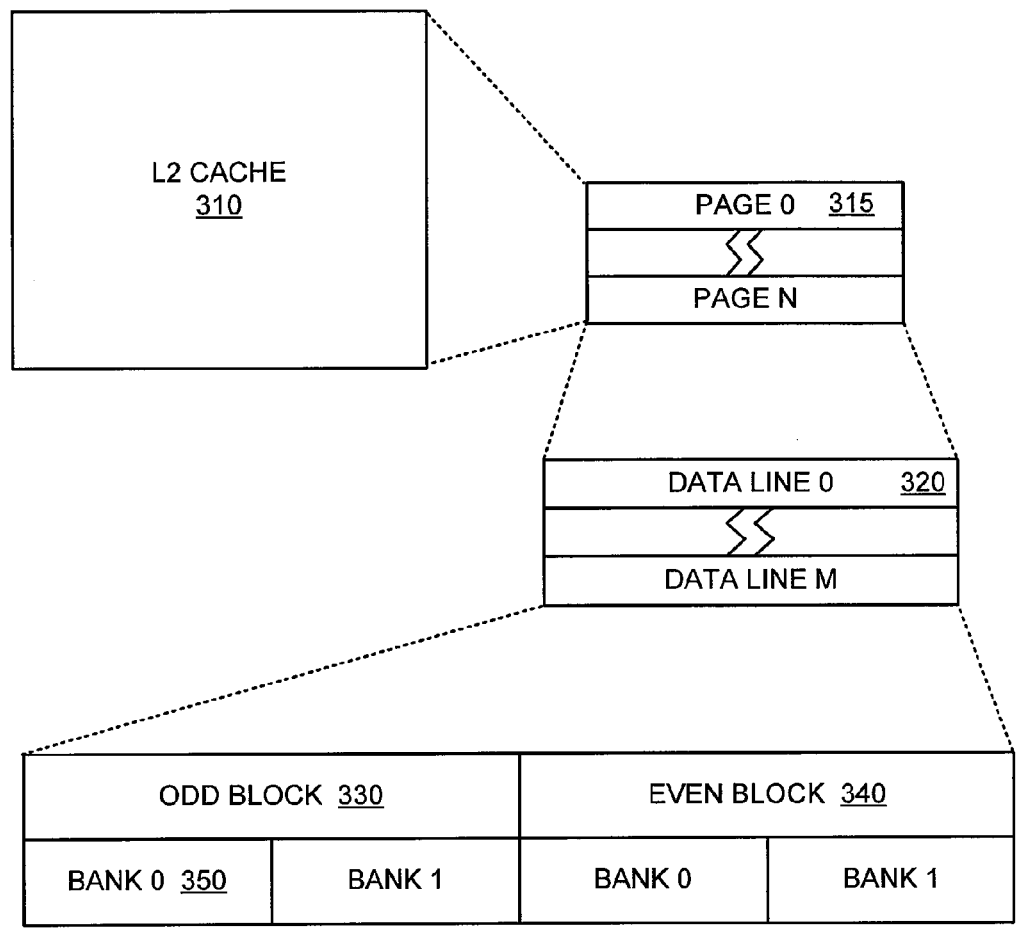
FIG. 3 is a block diagram illustrating an exemplary L2 cache organizational format.

Reference is briefly made to FIG. 3, which is a block diagram illustrating an exemplary L2 cache organizational format. As discussed above, the texture cache system 116 may include multiple caches, including, for example, an L1 cache and an L2 cache. The L2 cache 310 may include multiple L2 pages 315. Each page 315 may be divided into multiple L2 data lines 320. Each L2 data line 320 may be further divided into an even block 340 and an odd block 330. The even block 340 serves to process texture data from the even pipelines or cache lines and the odd block 330 serves to process texture data from the odd pipelines or cache lines. Within each of the blocks 330, 340, L2 is subdivided into banks 350. Although it is shown that each block includes two banks, one of ordinary skill will appreciate that a cache may include more or fewer banks. One should note that although the L2 data line 320 is shown as being configured to include two blocks, four banks and 8 pages, one of ordinary skill in the art will appreciate that a cache with blocks, banks, pages and channels configured differently from the example given is within the scope of this disclosure. Additionally, the L2 cache 310 may be configured as multiple L2 data lines 320 including, for example, 64, 128, 256, or 512. Furthermore, each L2 data line 320 may be of varying widths including, for example, 128, 256, 512, 1024, or 2048 bits wide.

Figure 4:
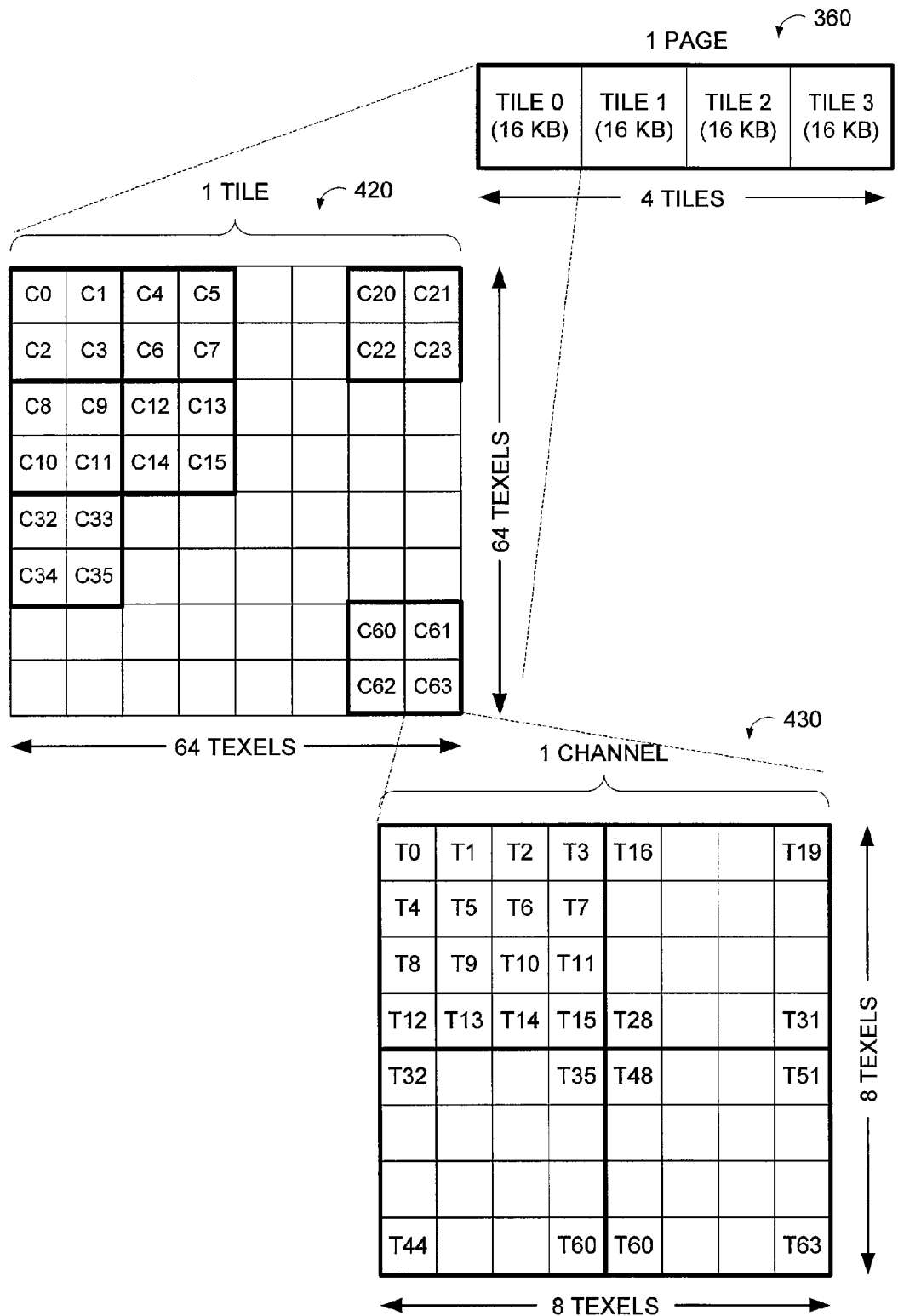
FIG. 4 illustrates an exemplary 32-bit texture tile.

Reference is now made to FIG. 4, which illustrates an exemplary 32 BPP (bits/pixel) texture tile. Each page 360 in FIG. 4 may be further divided into tiles. By way of example, each tile shown in FIG. 4 is 16 kB. Each tile 420 may be further subdivided into channels. In the example shown, the tile 420 is comprised of an 8×8 arrangement of channels totaling 64 channels numbered Ch 0 to Ch 63. Finally, each channel 430 may be further subdivided into individual texels. In the example shown, each channel 430 is comprised of an 8×8 arrangement of texels for a total of 64 texels. For the embodiments disclosed herein, the slices within texture map data is stored within tiles 420.

Referring back to FIG. 2, the texture data formatter 218 receives texture data 106 and organizes the texture in a way that makes future retrieval of this data more efficient. Texture data formatter 218 arranges slices within the texture data such that slices at the same mip level are grouped together. The slices are arranged according to increasing mip levels (i.e., decreasing resolution levels). In this way, the slices are arranged according to a "slice-major" format. Furthermore, the slices are "squeezed" or compressed together within tiles found in the texture data in such a way that individual slices that are smaller than the tile size do not take up individual tiles and leave unused memory space. Thus, if all the slices for a given mip level can fit into a single tile, these slices are compressed in the sense that only one tile is used to store all the slices for that mip level.

Once the texture data is arranged in a slice-major format and compressed together, the parameters associated with each slice within for each mip level are determined by the parameter calculation logic 220. These parameters are later used to determine the address for every slice within the newly arranged texture data so that the information can be retrieved from the texture cache in the future. Parameter calculation logic 220 calculates the following parameters: the total slice size, the texture width, texture height, slice index (N), the x and y offsets for the first slice (i.e., slice 0), and the x-stride value. Each of these parameters is calculated for all the mip levels. The value for the total slice size is the number of tiles required to store all slices with the same level of detail. In the event that all the slices for a given mip level can be "squeezed" or compressed into a single tile, the value is set to zero in order to denote this configuration. Once all values for all the parameters are calculated, the values are forwarded to address calculation logic 214. Address calculation logic 214 receives the values and calculates the addresses for all the slices comprising the texture data so that this data can be fetched from the texture cache system 116 in the future.

The address calculation logic 214 calculates the following parameters: the x and y offsets for the remaining slices, the (x, y) coordinates for each slice at each mip level, and the total number of tiles needed to store all the slices within the texture map data. Once all the texture data has been arranged and new address information have been determined, the texture data is ready for storage. The new (x, y) coordinates and the total number of tiles associated with each mip level are forwarded to the texture cache system 116. The texture data management unit 114 is coupled to the texture cache system 116. It should be appreciated that the texture data stored in the texture cache is now compressed and organized in a slice-major format so as to minimize access time and to ultimately reduce memory latency.

Furthermore, due to the efficient storage of texture data in memory, the amount of computational resources needed to retrieve the data is reduced. It should also be appreciated that the address calculation logic needed to retrieve the data is simplified because slices are aligned to convenient memory addresses. Finally, it should be appreciated from the description that an alternative volume texture map format is disclosed that can be implemented using the same parameters used for volume texture maps known by those skilled in the art. The format of this alternative texture map format is based on a slice-major format.

Figure 5:
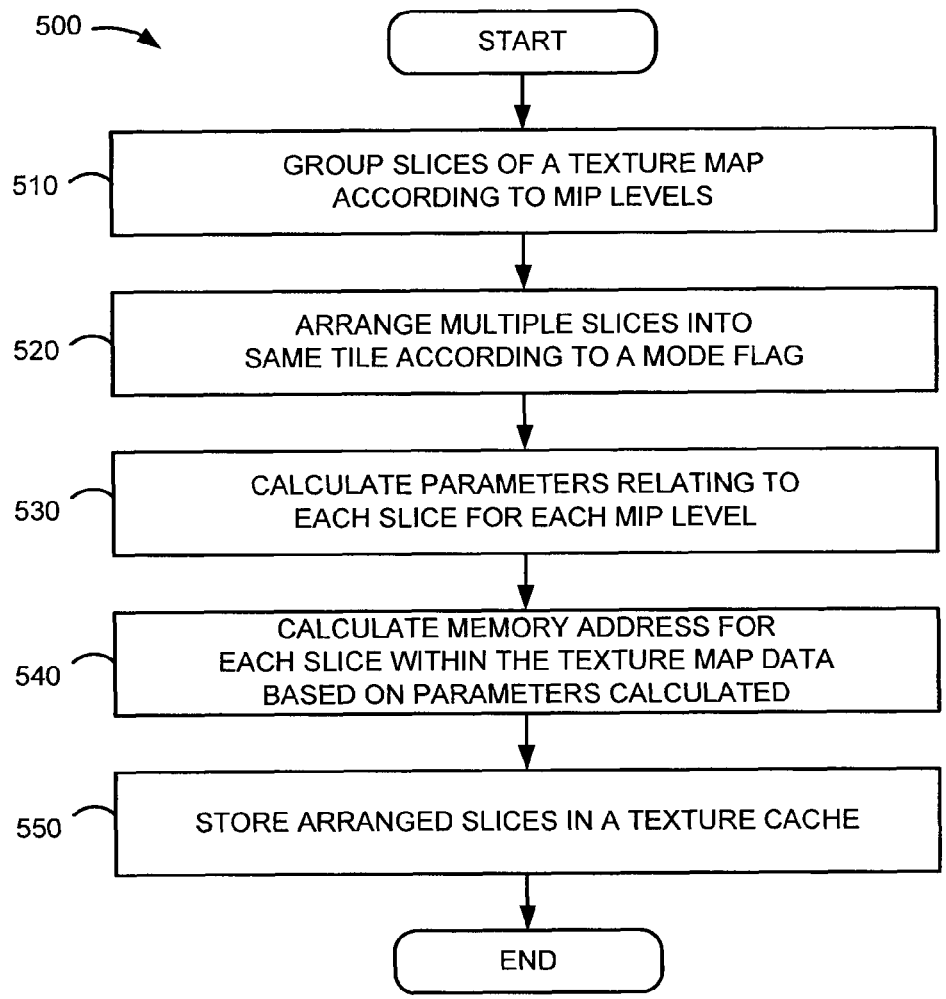
FIG. 5 depicts a top-level flowchart for an embodiment of a method for performing slice-major compression of tile texture data.

FIG. 5 depicts a top-level flowchart for an embodiment of a method for performing slice-major compression of tile texture data. In the steps that follow, various parameters are determined which are then utilized to calculate the address for each slice stored in the slice-major tiling format according to certain embodiments. The storage of the slices is optimized in such a way as to provide efficient data access. For some embodiments, the maximum volume texture size may be set to the dimensions 2k×2k×2k. For some embodiments, the address calculations can be further simplified by setting the maximum number of mip levels to a pre-determined number such as 12. For the parameters that follow, the parameters are calculated at each mip level. For purposes of nomenclature used herein, the use of the index N is used to denote the particular slice number. Furthermore, the use of the index d is used to denote a particular mip level. As a non-limiting example, the term Slice[0][d] Slice[0] at mip level d.

The width and height of a tile is measured in pixels, and the resolution is measured in terms of BPP (bits per pixel). For purposes of nomenclature used herein, the term BPP may be used interchangeably with the term BPE (bits per element). A given BPP value will have a corresponding tile width and tile height. As a non-limiting example, a BPP value of 32 (bits/pixel) corresponds to a tile width (TileWidth) of sixty-four pixels and a tile height (TileHeight) of sixty-four pixels. Table 1 below illustrates the different tile widths and heights for various BPP values:

TABLE 1

TileWidth and TileHeight Values for Various BPE Values

| BPE | TileWidth | eTW | TileHeight | eTH |
|---|---|---|---|---|
| 128 | 32 | 5 | 32 | 5 |
| 64 | 64 | 6 | 32 | 5 |
| 32 | 64 | 6 | 64 | 6 |

TABLE 1-continued

TileWidth and TileHeight Values for Various BPE Values

| BPE | TileWidth | eTW | TileHeight | eTH |
|---|---|---|---|---|
| 16 | 128 | 7 | 64 | 6 |
| 8 | 128 | 7 | 128 | 7 |
| 4 | 256 | 8 | 128 | 7 |
| 1 | 512 | 9 | 256 | 8 |

The parameter eTW in Table 1 corresponds to the number of bits needed to represent the TileWidth. For example, 5 bits are needed to store a TileWidth value of 32. Likewise, the parameter eTH corresponds to the number of bits needed to represent the TileHeight. The parameters eTW and eTH are used for bit-wise operations, as discussed further below. One should note that for the embodiments disclosed herein, a BPE value will be specified. Based on this value, the corresponding tile width and height is known.

Beginning with step 510, the slices within a texture map are grouped according to mip levels. Next, in step 520, multiple slices are arranged into the same tile according to a mode flag, which will be described later in further detail. In step 530, parameters relating to each slice are calculated for each mip level. The following parameters are calculated: the total slice size in terms of number of tiles, the texture width, texture height, and slice index. A value of zero for slice size denotes that the overall slice size is less than the size of a tile. In those instances, the storage of the tile texture data may be further optimized and "squeezed" or compressed into a single tile. This is preferable as the slices then do not occupy an entire tile by itself, leaving unused memory space. If the total size of all the slices for a given mip level is larger than one tile, then those slices are aligned to the tile and the number of tiles required to store these slices is calculated. Otherwise, if it is determined that the total size of all the slices is smaller than one tile, the texture width and height values are aligned to a power of two, and the value for the total slice size is set to zero to denote that multiple slices may be stored or "squeezed" into a single tile. The parameters above are calculated for each mip level. The number of mip levels will depend on the dimensions of the volume texture map. As a non-limiting example, suppose the volume texture size is set to a dimension of 2k×2k×2k. The parameters described above would then be calculated for d=0 to 11, or 12 mip levels.

Figure 6A:
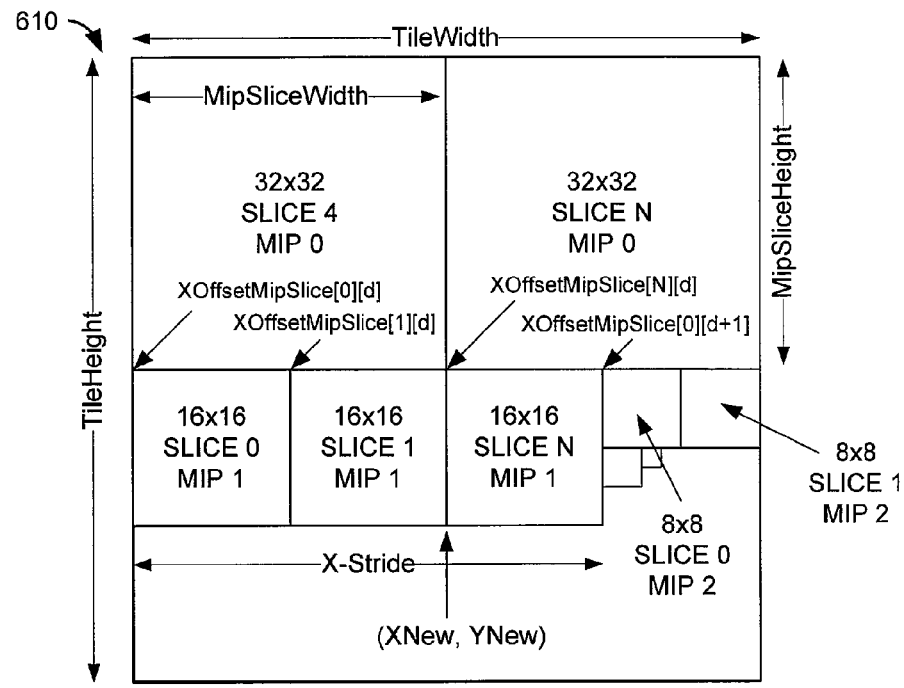
FIG. 6A illustrates Mode 0 for the embodiment in FIG. 5.
Figure 6B:
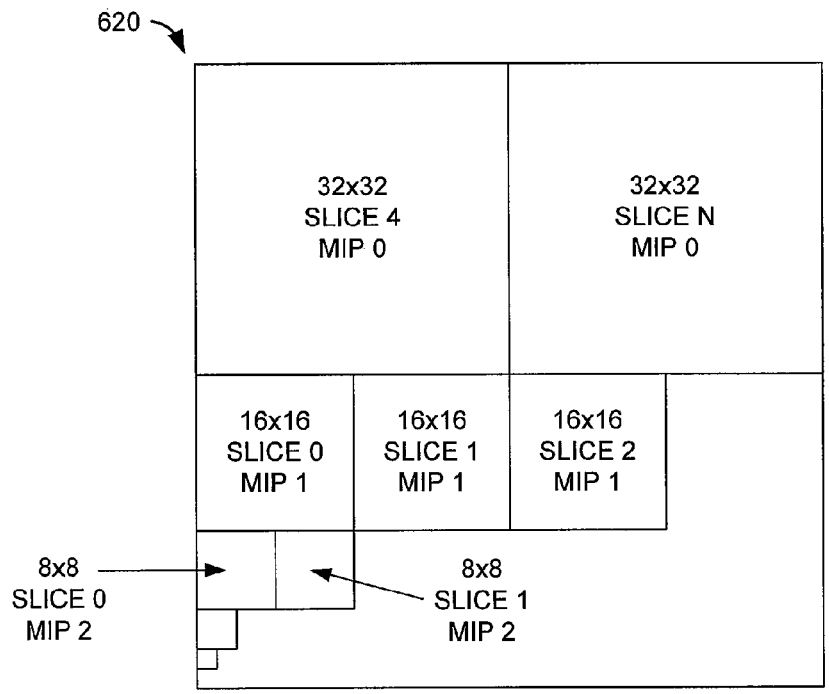
FIG. 6B illustrates Mode 1 for the embodiment in FIG. 5.

The following parameters are then calculated: the x offset for slice[0] (i.e., the first slice at each mip level), the y offset for slice[0], and the x-stride value. One should note that the values of these parameters will depend on what mode is selected. In the embodiment of FIG. 5, two primary modes may be utilized for performing slice-major storage of texture tile data, as denoted by the mode flag. In a first mode (i.e., Mode=0), the first slice (i.e., slice[0]) at each mip level d is not aligned to zero. That is, slice[0] at each mip level is not aligned to the leftmost boundary of the tile in which the slice is stored in. In a second mode (i.e., Mode=1), the first slice (i.e., slice[0]) at each mip level d is aligned to zero. That is, slice[0] at each mip level is aligned to the leftmost boundary of the tile in which the slice is stored in. Reference is briefly made to FIGS. 6A and 6B, which illustrates the two modes for the embodiment in FIG. 5. In shown in FIG. 6A, the first slice (i.e., slice[0]) within tile 610 at each mip level is not aligned to the leftmost boundary of the tile 610. This corresponds to Mode 0. In contrast, FIG. 6B shows the first slice at each mip level being aligned to the leftmost boundary of the tile 620. This corresponds to Mode 1. It should be appreciated that more or fewer slices may be employed depending on the number slices and mip levels that are required to render the object.

Referring back to FIG. 5, the x-stride value is calculated depending on which mode (Mode 0 or Mode 1) is being currently being utilized for slice-major storage of texture tile data. If Mode 0 is being utilized, then the value of x-stride (denoted by XStrideMip[d] below) is calculated using the x offset (denoted by XoffsetMipSlice[0][d]) and the tile width, eTW, based on the following relationship:

$$XStrideMip[d]=(1<<eTW)-XOffsetMipSlice[0][d]; \quad \text{Mode 0}$$

The operator "<<" denotes a bit-wise shift left operation. If Mode 1 is being utilized (i.e., where slice[0] at each mip level is aligned to the leftmost boundary of the tile), then the value XStrideMip[d] is simply equal to the value of the tile width, TileWidth, seen in Table 1 above.

The parameter XOffsetMipSlice[0][d] represents the offset in the X direction for the first slice (i.e., slice[0]) for a given mip level d. Furthermore, the value YOffsetMipSlice[0][d] represents the offset in the Y direction for slice[0] for a given mip level d. In the event that Mode 1 is used where slice[0] (the first slice) at each mip level d is aligned to the leftmost boundary of the tile, the value of the x offset is set to zero. Otherwise, the value of the x offset is calculated using the value x-stride previously calculated. Furthermore, if the value of x offset is not a power of two texels, then the value is rounded to the closest power of two value. For value for the x offset, XOffsetMipSlice[0][d], is then calculated based on the following relationship:

For Mode 1, XOffsetMipSlice[0][d]=0

For Mode 0,
XOffsetMipSlice[0][d]=XOffsetMipSlice[0][d]-1+(N[d-1]<<ew[d-1])&((1<<eXStrideMip[d-1])-1)

The value YOffsetMipSlice[d] is also calculated taking into consideration whether the alignment mode is Mode 0 or Mode 1. If Mode 1 is being utilized, the value is determined by the following relationships:

For Mode 1,
YOffsetMipSlice[0][d]=YOffsetMipSlice[0][d-1]+(((N[d-1]<<ew[d-1])+(1<<eTW)-1)>>eTW)<<eh[d-1]

For Mode 0,
YOffsetMipSlice[0][d]=YOffsetMipSlice[0][d]=YOffsetMipSlice[0][d-1]+(n[d-1]<<(ew[d-1]+eh[d-1]-eXStrideMip[d-1]))

In step 540, the memory address for each slice within the texture map is calculated based on the parameters calculated above. The offset for each slice N for a given mip level is then calculated for both the x and y directions. As discussed above, the parameter XOffsetMipSlice[N] denotes the offset in the X direction for slice N for a given mip level. Furthermore, the value YOffsetMipSlice[N] is the offset in the Y direction for slice N for a given mip level. These offsets are used to calculate the new (x, y) coordinates for each slice. The offset in both the x and y directions for slice[0] at each mip level is aligned to either a memory address of zero or to an address that is a power of two. For embodiments where the offset in the x direction is zero, slice[0] (at each mip level) will always be aligned to the left boundary of the tile. Furthermore the x-stride value will be equal to the tile width, TileWidth. Finally, it should be noted that if the sizes of multiple slices are less than one tile, those slices are "squeezed" or compressed into a single tile so that the individual slices don't each take up an entire tile. The compression is performed in a slice-major fashion where slices with the same mip level value are grouped together. Finally, in step 550, the arranged slices are stored into a texture cache for future retrieval.

Reference is made to FIG. 6A, which illustrates the different parameters used to calculate the address of each slice at different mip levels. The offset for slice[0] at each mip level may be aligned to either zero to an address value that's a power of two. Specifically, two different modes may be denoted for storage purposes. A mode 0 may be used to denote that slice[0] at each mip level is not aligned to zero (i.e., not aligned to the left-most boundary of the tile).

Figure 7:
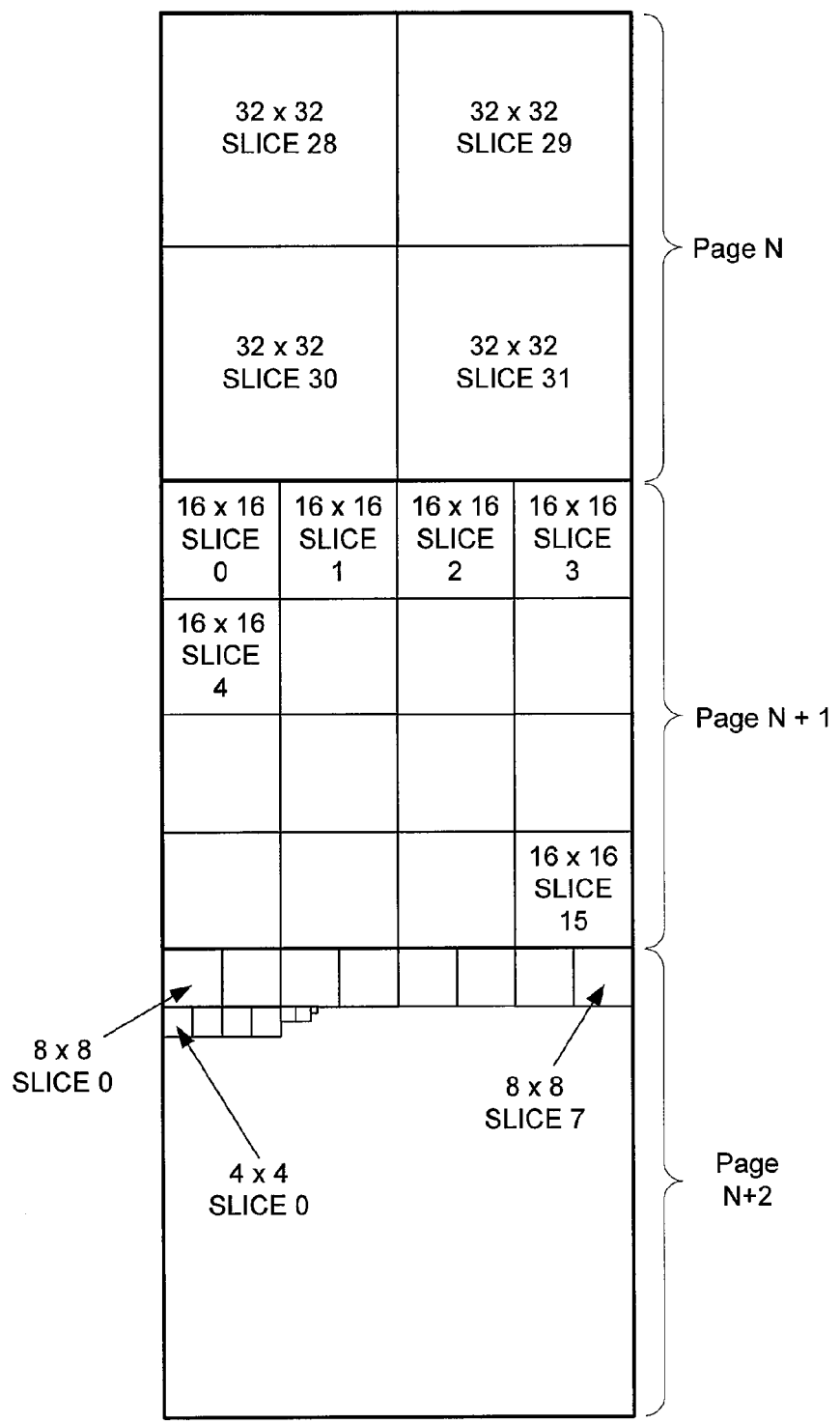
FIG. 7 depicts an embodiment for storing a volume texture map in a slice-major format within a texture cache.

Reference is now made to FIG. 7, which depicts an embodiment for storing a volume texture map in a slice-major format within a texture cache. As shown, the slices are stored in a slice-major format where slices at the same mip level are stored together in a contiguous fashion. It should also be appreciated that the slices are "squeezed" or compressed together such that individual slices which are smaller than a tile do not take up an entire tile, leaving wasted memory space. As depicted in FIG. 7, the slices are also stored in consecutive pages Page N to Page (N+2) within the texture cache memory. As discussed earlier, it is generally advantageous that slices at the same mip level be stored close together in memory. Preferably the slices are stored in the same cache page and even within the same cache line, if possible. This leads to fast data accesses and ultimately to reduced memory latency.

Figure 8:
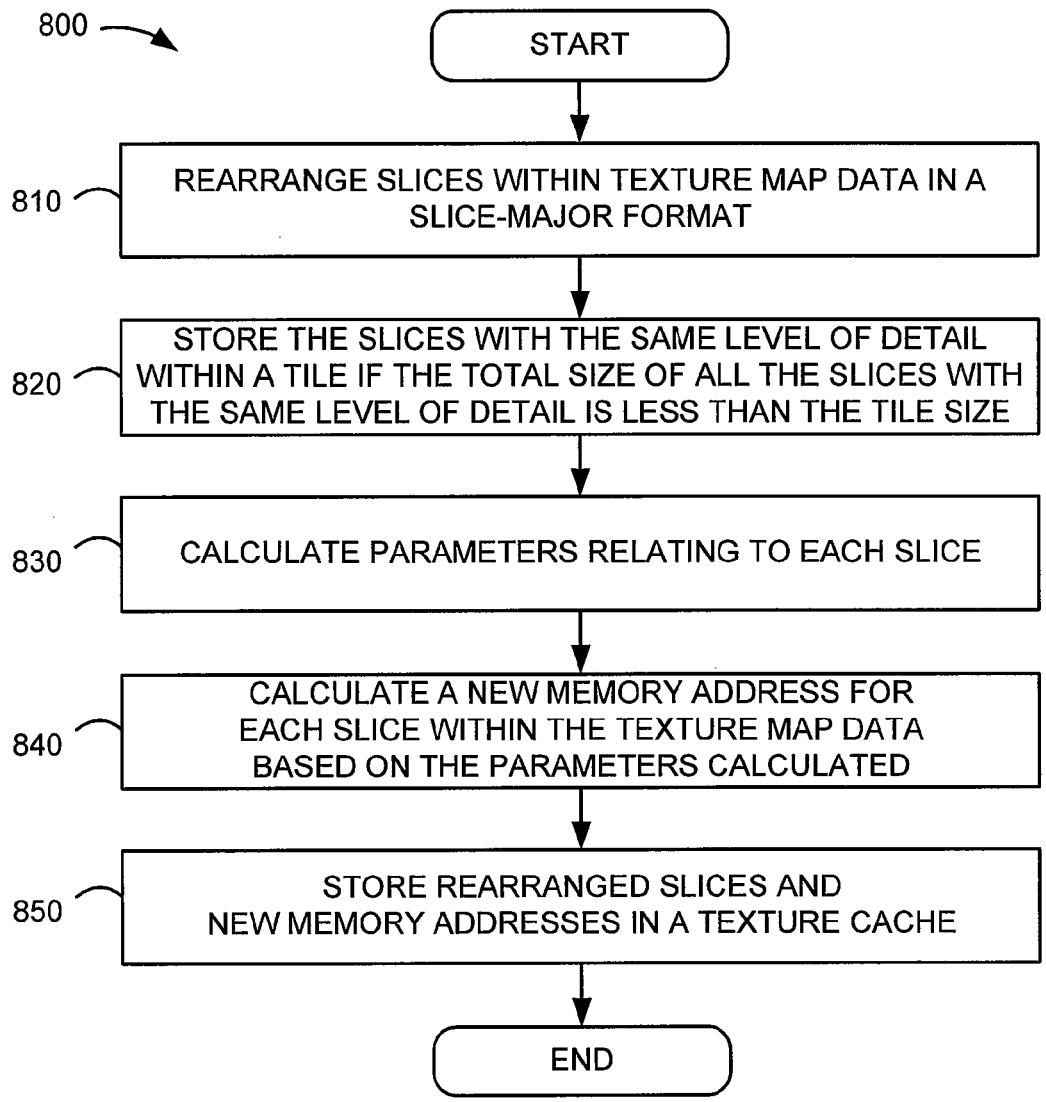
FIG. 8 depicts a top-level flowchart for an alternative embodiment of a method for performing slice-major compression of tile texture data.

FIG. 8 depicts a top-level flowchart for an alternative embodiment of a method for performing slice-major compression of tile texture data. Starting with step 810, the slices within texture map data are rearranged according to a slice-major format. Next, in step 820, the slices with the same level of detail are stored within the tile if the total size of all the slices with the same level of detail is less than the tile size. In step 830, parameters relating to each slice are calculated. A new memory address for each slice within the texture map data is then calculated in step 840 based on the parameters calculated in step 830. Finally, in step 850, the rearranged slices, along with the new memory addresses are stored in a texture cache.

Any process descriptions or blocks in flow charts should be understood as representing logic, segments, or portions of code which include one or more executable instructions for implementing specific logical functions, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Furthermore, it should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

For example, it will be appreciated by persons skilled in the art, based on the description provided herein that embodiments include a graphics processing unit comprising a texture management unit configured to organize texture map data according to a slice major format, wherein the texture map data spans at least one mip level. Furthermore, the graphics processing system comprises a texture cache, wherein the texture cache is coupled to the texture management unit and configured to receive the organized texture map data from the texture management unit.

In some embodiments, the texture management unit further comprises a texture data formatter configured to arrange slices within the texture map data in the slice major format, parameter calculation logic configured to calculate parameters characterizing each slice within the texture map data, and address calculation logic configured to determine a cache memory address for each slice within the texture map data using the calculated parameters.

In other embodiments, the texture data formatter is further configured to store multiple slices within a tile if the slices are smaller than the tile. In other embodiments, the texture data formatter arranges slices within the texture map data according to either a mode 0 or a mode 1, wherein mode 0 denotes that the first slice for each mip level is aligned to the leftmost boundary of the tile the slice is stored in and wherein mode 1 denotes that the first slice for each mip level is not aligned to the leftmost boundary of the tile the slice is stored in.

In other embodiments, the parameters comprise slice size in terms of number of tiles, texture width, texture height, and slice index for each slice. For some embodiments, the parameters further comprise an x offset for slice 0 denoting the address offset in the x direction for the first slice at each mip level, a y offset for slice 0 denoting the address offset in the y direction for the first slice at each mip level, and an x-stride value denoting the total width of each set of slices at each mip level. For some embodiments, the parameters are calculated for every mip level. For some embodiments, the x offset for the first slice is set to 0 if the mode is 1. For some embodiments, the x offset for the first slice is rounded to a power of two if the mode is 0. For some embodiments, the cache memory address for each slice within the texture map data comprise a new value x denoting the x coordinate for each slice, a new value y denoting the y coordinate for each slice, and a tile index denoting the total number of tiles needed to store all the slices within the texture map data.

In accordance with other embodiments of the invention, a method for storing texture map data in a graphics processor and can be broadly summarized by the following: grouping slices of a texture map data together according to mip levels, arranging a multiple slices into the same tile according to a mode flag, calculating parameters relating to each slice for each mip level, calculating a memory address for each slice within the texture map data based on the parameters calculated, and storing the rearranged slices in a texture cache.

In certain embodiments, arranging slices further comprises aligning the first slice for each mip level along the leftmost boundary of the tile the slices are stored in if the mode flag is set to 1. For some embodiments, arranging slices further comprises aligning the first slice for each mip level along the rightmost boundary of the last slice in the next lower mip level if the mode flag is set to 0. In some embodiment, calculating parameters comprises calculating a texture width, calculating a texture height, calculating a slice size in terms of number of tiles, calculating a slice index for each slice, calculating an x offset for slice 0 denoting the address offset in the x direction for the first slice at each mip level, calculating a y offset for slice 0 denoting the address offset in the y direction for the first slice at each mip level, and calculating an x-stride value denoting the total width of each set of slices at each mip level. For some embodiments, calculating a memory address for each slice within the texture map data comprises calculating a new value x denoting the x coordinate for each slice, calculating a new value y denoting the y coordinate for each slice, and calculating a tile index denoting the total number of tiles needed to store all the slices within the texture map data.

In accordance with other embodiments of the invention, a method for storing texture map data in a graphics processor and can be broadly summarized by the following: rearranging slices of a texture map data in a slice-major format, wherein slices with a same level of detail are grouped together, storing the slices with the same level of detail within a tile if the total size of all the slices with the same level of detail is less than the size of the tile, calculating parameters relating to each slice, wherein the parameters are calculated for each level of detail, calculating a new memory address for each slice within the texture map data based on the parameters calculated, and storing the rearranged slices and new memory addresses in a texture cache.

For certain embodiments, calculating parameters relating to each slice comprises calculating the number of tiles required to store all slices with the same level of detail, calculating the dimensions of the texture, calculating a slice index for each slice, calculating an x offset for slice 0 denoting the address offset in the x direction for the first slice for each level of detail, calculating a y offset for slice 0 denoting the address offset in the y direction for the first slice for each level of detail, and calculating an x-stride value denoting the total width of each set of slices for each level of detail. For some embodiments, storing the slices with the same level of detail within a tile further comprises aligning the first slice for each level of detail along the rightmost boundary of the tile. For some embodiments, storing the slices with the same level of detail within a tile further comprises aligning the first slice for each level of detail next to the last slice at the next lower level of detail. For certain embodiments, calculating a new memory address comprises calculating x, y coordinates for each rearranged slice at each mip level, and calculating the total number of tiles needed to store all the slices within the texture map data.

At least the following is claimed:

1. A graphics processing system comprising:
   a texture management unit configured to organize texture map data according to a slice major format, wherein slices of the same level are stored together, and wherein the texture map data spans at least one mip level; and
   a texture cache, wherein the texture cache is coupled to the texture management unit and configured to receive the organized texture map data from the texture management unit;
   wherein the texture management unit further comprises:
   a texture data formatter configured to arrange slices within the texture map data in the slice major format;
   parameter calculation logic configured to calculate parameters characterizing each slice within the texture map data; and
   address calculation logic configured to determine a cache memory address for each slice within the texture map data using the calculated parameters.

2. The system of claim 1, wherein the texture data formatter is further configured to store multiple slices within a tile if the slices are smaller than the tile.

3. The system of claim 1, wherein the texture data formatter arranges slices within the texture map data according to either a mode 0 or a mode 1,
   wherein mode 0 denotes that the first slice for each mip level is aligned to the leftmost boundary of the tile the slice is stored in; and
   wherein mode 1 denotes that the first slice for each mip level is not aligned to the leftmost boundary of the tile the slice is stored in.

4. The system of claim 1, wherein the parameters comprise:
   slice size in terms of number of tiles;
   texture width;
   texture height; and
   slice index for each slice.

5. The system of claim 1, wherein the parameters further comprise:
- an x offset for slice 0 denoting the address offset in the x direction for the first slice at each mip level;
- a y offset for slice 0 denoting the address offset in the y direction for the first slice at each mip level; and
- an x-stride value denoting the total width of each set of slices at each mip level.

6. The system of claim 5, wherein the x offset for the first slice is set to 0 if the mode is 1.

7. The system of claim 5, wherein the x offset for the first slice is rounded to a power of two if the mode is 0.

8. The system of claim 1, wherein the parameters are calculated for every mip level.

9. The system of claim 1, wherein the cache memory address for each slice within the texture map data comprise:
- a new value x denoting the x coordinate for each slice;
- a new value y denoting the y coordinate for each slice; and
- a tile index denoting the total number of tiles needed to store all the slices within the texture map data.

10. A method for storing texture map data in a graphics processor comprising:
- grouping slices of a texture map data together according to mip levels;
- arranging multiple slices into the same tile according to a mode flag;
- calculating parameters relating to each slice for each mip level;
- calculating a memory address for each slice within the texture map data based on the parameters calculated; and
- storing the arranged slices in a texture cache.

11. The method of claim 10, wherein arranging slices further comprises aligning the first slice for each mip level along the leftmost boundary of the tile the slices are stored in if the mode flag is set to 1.

12. The method of claim 10, wherein arranging slices further comprises aligning the first slice for each mip level along the rightmost boundary of the last slice in the next lower mip level if the mode flag is set to 0.

13. The method of claim 10, wherein calculating parameters comprises:
- calculating a texture width;
- calculating a texture height;
- calculating a slice size in terms of number of tiles;
- calculating a slice index for each slice;
- calculating an x offset for slice 0 denoting the address offset in the x direction for the first slice at each mip level;
- calculating a y offset for slice 0 denoting the address offset in the y direction for the first slice at each mip level; and
- calculating an x-stride value denoting the total width of each set of slices at each mip level.

14. The method of claim 10, wherein calculating a memory address for each slice within the texture map data comprises:
- calculating a new value x denoting the x coordinate for each slice;
- calculating a new value y denoting the y coordinate for each slice; and
- calculating a tile index denoting the total number of tiles needed to store all the slices within the texture map data.

15. A method for storing texture map data in a graphics processor comprising:
- arranging slices within texture map data in a slice-major format, wherein slices with a same level of detail are grouped together;
- storing the slices with the same level of detail within a tile if the total size of all the slices with the same level of detail is less than the size of the tile;
- calculating parameters relating to each slice, wherein the parameters are calculated for each level of detail;
- calculating a new memory address for each slice within the texture map data based on the parameters calculated; and
- storing the arranged slices and new memory addresses in a texture cache.

16. The method of claim 15, wherein calculating parameters relating to each slice comprises:
- calculating the number of tiles required to store all slices with the same level of detail;
- calculating the dimensions of the texture;
- calculating a slice index for each slice;
- calculating an x offset for slice 0 denoting the address offset in the x direction for the first slice for each level of detail;
- calculating a y offset for slice 0 denoting the address offset in the y direction for the first slice for each level of detail; and
- calculating an x-stride value denoting the total width of each set of slices for each level of detail.

17. The method of claim 15, wherein storing the slices with the same level of detail within a tile further comprises aligning the first slice for each level of detail along the rightmost boundary of the tile.

18. The method of claim 15, wherein storing the slices with the same level of detail within a tile further comprises aligning the first slice for each level of detail next to the last slice at the next lower level of detail.

19. The method of claim 15, wherein calculating a new memory address comprises:
- calculating x, y coordinates for each arranged slice at each mip level; and
- calculating the total number of tiles needed to store all the slices within the texture map data.

* * * * *